HUGH R. EDWARDS
INVENTOR.

ATTORNEY

June 1, 1965 H. R. EDWARDS 3,187,090
CABLE SPLICING BOOTS
Filed Jan. 3, 1961 2 Sheets-Sheet 2

HUGH R. EDWARDS
INVENTOR.

BY

ATTORNEY

United States Patent Office 3,187,090
Patented June 1, 1965

3,187,090
CABLE SPLICING BOOTS
Hugh Robert Edwards, Corona del Mar, Calif., assignor to Walter A. Plummer, Sherman Oaks, Calif.
Filed Jan. 3, 1961, Ser. No. 80,149
8 Claims. (Cl. 174—138)

This invention relates to flexible boot constructions and more particularly to an improved boot designed for use about cable joints of the type employed in lead-sheathed tubing or the like impervious tubing and having its principal objective the exclusion of moisture both during the processing of a cable joint and thereafter.

One of the very vexatious problems attending the use of lead-sheathed cable is the protection of these against the entrance of moisture either as liquid or vapor particularly in the zone of joints, either at the time such joints are in the process of being formed or subsequent to the closure of the joint. Cabling of this type contains a multiplicity of small gauge wires customarily insulated from one another by paper or other type dielectric. Extreme care is exercised during the manufacture of such cables to exclude all moisture because its presence tends to modify the dielectric and other properties of the assembly and causes leakage currents leading to a multiplicity of undesirable results in the use of cables. Another serious drawback is that the presence of moisture often causes swelling of the dielectric wrappings and internal pressures which can rupture the sheath.

Simple precautions safeguarding against these risks can be taken during actual processing of the splice. Entirely different precautions must be exercised to protect the joints during intervals between splicing periods. The hazards at such times are so great that elaborate precautions are exercised at the end of the splicing period to enclose the area undergoing splicing so securely and snugly that it is not uncommon to consume fully as much time in applying and removing the protective wrapping as occupied in splice operations proper. These operations are equally costly in both time and materials involved in carrying out the protective operations.

In view of the foregoing shortcomings and disadvantages of prior practices in the splicing of sheathed cables, a principal object of the present invention is to provide an improved technique and equipment entirely avoiding the deficiencies of prior practices. To this end, the invention contemplates the provision of a simple, one-piece unitary boot of flexible material impervious to moisture and specially constructed for ease and speed with which it can be applied and removed from cable joints and equally useful in protecting such joints both during the processing of the joint and applicable thereover as a permanent and supplemental protective covering for the joint. Slightly different configurations of the boot are provided to meet the varying requirements of temporary and permanent use for reasons which will be readily apparent to those skilled in this art.

The boot is conveniently and inexpensively fabricated from a plurality of elements blanked from flexible sheet material having the desired properties following which the opposite lateral edges of the blanked elements are bonded or fused together. One of the two principal elements is slit longitudinally from end to end and provided with readily inter-engageable high-strength seam means capable of providing a fluid-tight seam in their assembled positions. Owing to the fabrication of the boot from a plurality of elements the boot can be readily tailored to meet the requirements of use including a temporary boot construction having an enlarged pocket for enclosing the wire ends during the intervals between splicing operations and a second construction lacking a wire receiving pocket and tailored to provide a snug fit with the conventional cable joint sleeve. If desired, a suitable solvent can be applied to the inter-engaging portions of the seam to seal the seam providing positive assurance against entrance of moisture. When so assembled, the jacket must be destroyed when removing it. Where it is desired to reuse the boot and to employ it only temporarily between splicing operations, additional protection is obtained by using a plurality of similar seams arranged in parallel wtih one another. In this case, there must be a failure of both seams in the same boot before it is possible for moisture to enter the interior of the boot. Owing to the excellent reliability of each seam, this happenstance of simultaneous or double failure of both seams is highly unlikely.

In view of the foregoing it is a primary object of the present invention to provide an improved method and protective boot specially designed for use in protecting cable joints from the entry of moisture either during splicing operations or thereafter.

Another object of the invention is the provision of an inexpensive easily assembled and disassembled protective boot to enclose portions of cabling undergoing splicing and effective in preventing the entry of moisture when in place on the cable.

Another object of the invention is the provision of a simple one-piece boot assembly formed from flexible sheet material impervious to moisture and provided with an easily opened and closed longitudinal seam to facilitate the assembly of the boot about portions of cabling undergoing splicing and cooperable therewith to prevent the entry of moisture and foreign matter until the joint is completed and sealed closed.

Another object of the invention is the provision of a unitary one-piece protective boot provided centrally therewith an interiorly opening pocket sufficiently large to receive cable terminals while awaiting splicing to one another to form a cable joint and featuring access longitudinal seams arranged in parallel with one another and by which the boot can be closed and opened during assembly and disassembly about a joint.

These and other more specific objects will appear upon reading the following specification and claims and upon considering in connection therewith the attached drawings to which they relate.

Referring now to the drawings in which preferred embodiments of the invention are illustrated.

Figure 1:
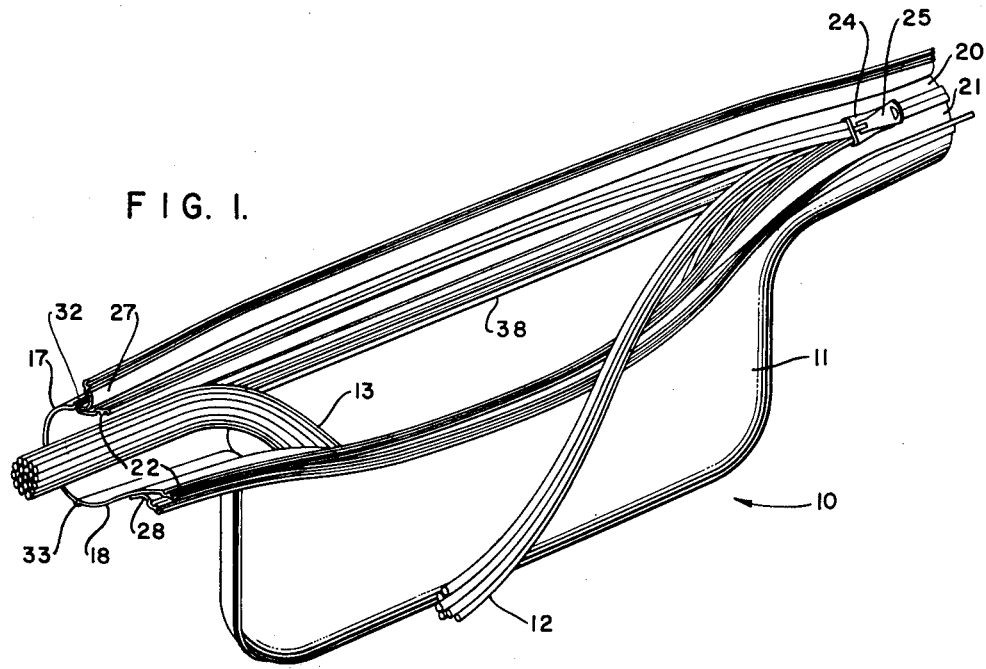
FIGURE 1 is a perspective view of one preferred embodiment of the boot particularly suitable for use to enclose the terminal ends of wires undergoing splicing before the splicing operations have been completed, the boot being shown during the seam closing operation.
Figure 2:
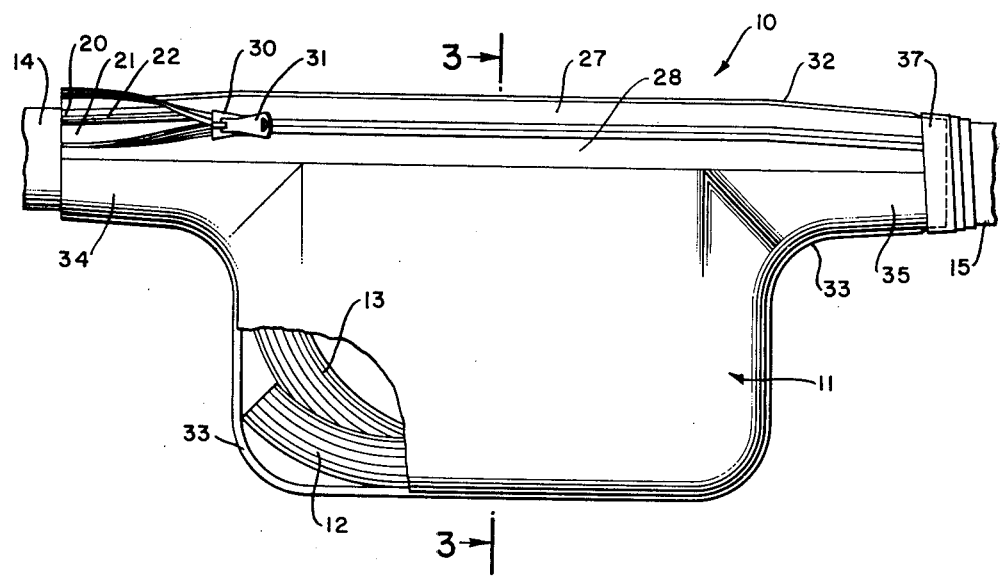
FIGURE 2 is a side elevational view partly in section of the boot shown in FIGURE 1, one end being sealed closed and the other end approaching closed position.
Figure 3:
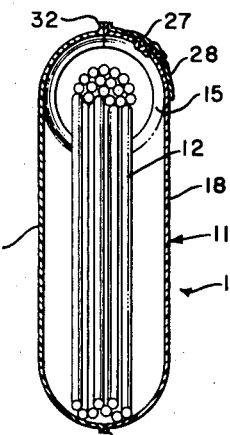
FIGURE 3 is a transverse sectional view taken along line 3—3 on FIGURE 2.

Referring more particularly to FIGURES 1 and 2, there is shown a preferred embodiment of the invention designated generally 10 and comprising a unitary one-piece boot. Boot 10 may be described as an elongated generally tubular member having an enlargement 11 protruding laterally from its midportion and having a suitable configuration, such as that shown, and adapted to receive the loose and unspliced ends 12 and 13 of a pair of cabling ends undergoing splicing. Cabling of the type to which the invention is particularly related is normally provided with a continuous lead sheath. Such sheathing is indicated at 14 and 15 in FIGURE 2 but has been omitted from the FIGURE 1 showing.

Boot 10 is here shown as formed in two principal halves including a rear half 17 and a forward half 18 blanked from impervious flexible sheet material as, for example polyethylene, polyvinyl chloride, sheet rubber or from any of numerous other materials having generally similar properties. The forward member 18 is shown as formed in two halves adapted to be separably joined together by suitable fluid-tight closure seam means comprising a pair of strips 20, 21, one edge of each of which is fuse bonded or otherwise sealed to the longitudinal slit of member 18. The free edges of tapes 20, 21 are formed with complementally shaped interlocking tongue and groove means 22 adapted to interlock in fluid-tight manner simply by pressing the tongues and grooves into mating relationship either by finger pressure or by the aid of suitable slide fastener closure device 24 adapted to be manipulated by a pull tab 25. When tab 25 is pulled lengthwise of the seam and to the left as viewed in FIGURE 1, the seam is closed whereas if the pull tab is pulled to the right the parts of the seam are disengaged.

To provide further assurance against the possibility of moisture seeping past the first described seam, there may be provided a second and similar pair of slide fastener tapes 27, 28 identical with tapes 20, 21 adapted to be opened and closed in overlapping relation to the inner seam 22 as by slide fastener closure device 30 having a pull tab 31.

The two principal halves 17, 18 of boot 10 are joined together along their opposite lateral edges 32, 33 by bonding or heat sealing. Seam 32 extends along the upper side of the boot and is substantially straight throughout its length whereas seam 33 extends along the two tubular end portions 34, 35 of the boot and then downwardly along the opposite ends and the bottom of pocket 11. This mode of blanking and assembling the principal parts of the boot provide a convenient and expeditious mode of manufacturing the irregularly shaped boot from flat sheet material to provide a tailored boot product having the design configuration shown in FIGURES 1 and 2. The tubular opposite end portions 34, 35 each have similar girths selected snugly to fit the adjacent lead sheath portions 14 and 15 of the cabling upon closure of the slide fastener seams described above. Thereafter, further assurance against the entry of moisture at the ends of the boot is provided by applying a sealing compound and additional protection in the form of wrappings of impervious friction tape 37.

In the use of the boot let it be assumed that the splicer has completed the day's work and has spliced a portion 38 only of the cable wires and that there remains a number of cable wire ends 12 and 13 yet to be spliced. To protect the entire zone and to prevent moisture from contacting the wires or entering the open cable ends, the splicer selects a boot 10 having tubular ends 34, 35 of the requisite size fitting snugly the cable sheath. The splicer opens the two slide fastener seams and applies the boot from the back side of the cable with the open seam facing him. Unspliced wire ends 12 and 13 are then inserted into the boot pocket whereupon the inner seam is closed from end to end. Thereafter the outer pair of slide fastener tapes 27, 28 are similarly closed. If extra precautions are advisable, the workman applies a solvent to the mating portions of the slide fastener tapes immediately prior to closing them with the result that the solvent provides a permanent bond and seal between the parts upon their being closed together. In these circumstances, it is necessary to destroy the boot when it is desired to resume splicing operations. However, this is not objectionable due to the simple and inexpensive nature of the boot. After the two seams have been closed, sealing compound paste is desirably applied to the opposite ends of tubular portions 34, 35 following which friction tape is snugly wrapped thereover as is indicated at 37 in FIGURE 2.

Referring now to FIGURES 4 to 7, there is shown a second preferred embodiment of the invention, the same reference characters distinguished by the application of a prime being used to designate the same or similar parts. The principal difference between the two embodiments is that the FIGURE 4 to 7 construction is tailored to fit the finished cable joint and to be permanently assembled about this joint after the opposite ends 40, 40 of a lead sleeve 41 have been sealed by wiping them with molten lead in accordance with conventional practice or otherwise firmly sealed to the adjacent portions of the cable sheath 14', 15'. Accordingly, boot 10' is generally tubular throughout and has a large diameter portion centrally thereof snugly fitting the underlying sleeve 41. The identical tapering tubular ends 34', 35' converge to a size closely fitting the main body of the cable sheath in the manner made clear in FIGURES 4 and 5.

Figure 4:
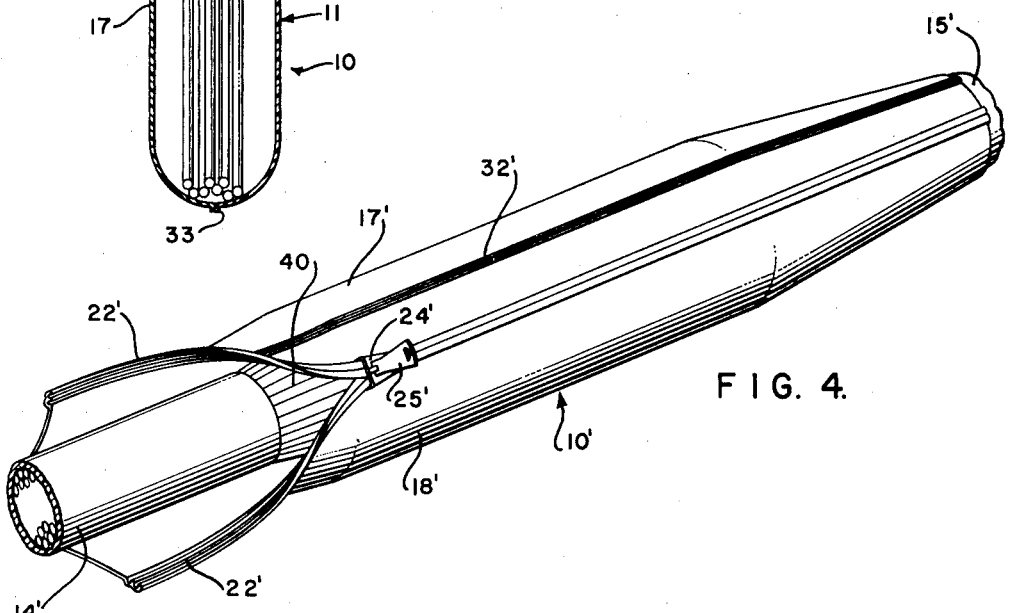
FIGURE 4 is a perspective view of another preferred embodiment of the invention designed for permanent assembly about a closed cable joint, the boot being substantially fully assembled about the joint.
Figure 5:
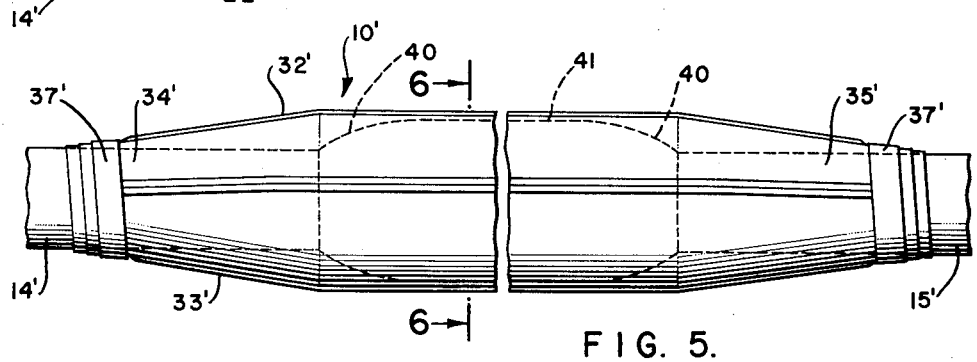
FIGURE 5 is a side elevational view of the FIGURE 4 construction in its fully assembled position.
Figure 6:
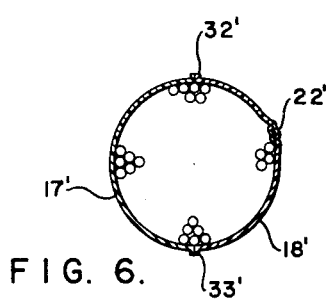
FIGURE 6 is a transverse view taken along line 6—6 on FIGURE 5.

As will be observed from FIGURES 4 and 5, boot 10' is appreciably longer than joint sleeve 41 in order that its opposite ends may be thoroughly sealed to the adjacent portions of the cable sheathing 14', 15'. It is also pointed out that in the assembly of boot 10' to a cable joint, it is the preferred practice to apply solvent to the mating tongues and grooves 22' of the seam in order to permanently seal the seam closed. Accordingly, access to the joints can be had only by destroying the boot with a knife or the like. As the seam is finally closed the slider device 24', 25' is detached from the closed end of the seam before sealing tapes 37' are applied.

Figure 7:
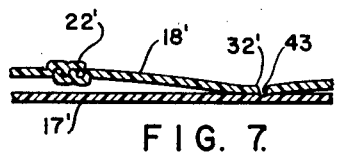
FIGURE 7 is an enlarged fragmentary cross-sectional view taken through one lateral edge of the boot shown in FIGURES 4 to 6 during one stage of manufacture.

FIGURE 7 shows details of a preferred mode of securing principal components 17', 18' of boot 10' together. The two halves 17', 18' are laid flat against one another and a heated roller or other sealing shoe is pressed against the areas desired to be joined and sealed together to provide the seam 32'. In doing so, the heated sealing member forms a deep channel 43 partially severing elements 17', 18' as the adjacent areas underlying and to either side of channel 43 are heat fused together. After the seam has set, the flashing exteriorly of groove 43 is cut away along the trough of the channel to complete this phase of the assembly operation.

While the particular cable splicing boot herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A weatherproof cable splice boot comprising, a one-piece unitary envelope formed from a plurality of pieces of impervious flexible insulating sheet stock material tailored to embrace a cable splice and having integral tubular sleeves at the opposite ends thereof snugly embracing a cable to either end of the splice proper in the assembled condition of said splice boot, said envelope including longitudinal seam means extending lengthwise of said boot and of each of said tubular sleeves, said sleeve means being formed from impervious flexible material and having complementally shaped interlocking tongue and groove means mateable to provide a fluid-tight seam lying substantially in the same surface as the portions of said splice boot to either side of said seam, and said seam being located along one lateral side of the cable when the boot is assembled thereabout whereby rainwater and the like is readily shed from said seam as it flows downwardly across the side face of said boot.

2. A cable splice boot as defined in claim 1 characterized in being of appreciably greater diameter along the midportion thereof than at its opposite ends, and being further characterized in that the same is fabricated from a plurality of separate elongated strips of sheet material permanently bonded together in a fluid-tight manner along their opposite lateral edges.

3. A cable splice boot as defined in claim 1 characterized in that the midportion of said boot is shaped to provide a deep pocket sufficiently large to receive surplus lengths of the cable wires prior to splicing together a pair of mating cable ends to provide a finished splice whereby said cable ends are protected against the entry of moisture between periods of active splicing operations.

4. A cable splice boot as defined in claim 1 characterized in that said seam means includes multiple similar interlocking tongue and groove assemblies arranged in parallel with one of said tongue and groove assemblies being positioned interiorly of the other lengthwise of said boot to provide a double safeguard against the possibility of moisture entering said boot while closed.

5. An inexpensive single-use weatherproof cable splice boot adapted to be destroyed to effect removal of the same from a cable splice in process of being completed, said boot being formed in one integral unit from three elongated blanks of thin supple impervious sheet plastic material having the same length, two of said blanks having a pair of straight parallel edges provided with interlocking seam-forming tapes bonded thereto and interfitting with one another to provide a fluid-tight seam when closed, the combined width of said two blanks with their seam-forming tapes interlocked and closed being substantially the width of the third one of said blanks, the lateral edges of said seam-carrying blanks being bonded to the lateral edges of said third blank to form a one-piece splice boot adapted to lie flat with the interior surfaces thereof snugly against one another when said boot is not held extended, and the interengaging surfaces of said seam-forming tapes being adapted to be bonded closed when said boot is assembled about a cable splice between periods of splicing operations and said boot being removable from the cable splice by slitting the same from end to end thereof.

6. An inexpensive one-piece generally tubular boot adapted for use in protecting an incomplete cable splice between active periods of a splicing operation, said boot being formed entirely of impervious nonconductive supple thin plastic material and comprising an elongated tubular body of substantially larger cross section tapering at either end into relatively smaller diameter sleeves adapted to closely and snugly embrace cable sheathing adjacent the splice, said tubular body being formed of sheet material of uniform thickness, and complementally shaped interlocking tongue and groove seam-forming means of supple plastic material extending from end-to-end of said boot, said seam-forming means being located along one side of said boot and, when closed, cooperating with the snug fit of said sleeves with cable sheathing to form a substantially fluid-tight enclosure for a cable splice.

7. A unitary plastic cable boot as defined in claim 6 characterized in that said tapering sleeves each include a plurality of separate sheets of plastic material fused together along their opposite lateral edges to form a pair of tubular sleeves of gradually decreasing internal diameter as the distance from the midlength of said boot increases.

8. An inexpensive one-piece generally tubular boot adapted for use in protecting a cable splice, said boot being formed entirely of impervious nonconductive supple thin plastic material and comprising an elongated tubular body of substantially uniform cross-section throughout the major portion of its length, the opposite ends of said boot converging to form relatively small diameter tapering sleeves adapted to snugly embrace cable sheathing immediately adjacent the opposite ends of a cable splice, said tapering sleeves having fused seams along their diametrically opposed sides which seams converge toward the opposite ends of said boot to diameters snugly to embrace cable sheathing to either end of a splice, and flexible plastic seam-forming means extending throughout the length of said boot and including complementally shaped interlocking tongue and groove means cooperating to form a fluid-tight seam when closed together, said seam forming means being located along one side of said boot and between the converging fused seams of said tapering sleeves.

References Cited by the Examiner
UNITED STATES PATENTS

| | | | |
|---|---|---|---|
| 1,977,774 | 10/34 | Osborne. | |
| 2,585,054 | 2/52 | Stachura | 174—36 |
| 2,615,224 | 10/52 | Shur | 24—205.1 |
| 2,839,596 | 6/58 | Cheney et al. | 174—5 X |
| 2,960,561 | 11/60 | Plummer | 174—68 X |
| 3,054,849 | 9/62 | Colbert | 174—92 |

JOHN F. BURNS, *Primary Examiner.*

E. JAMES SAX, JOHN P. WILDMAN, *Examiners.*